United States Patent [19]

Monahan et al.

[11] 4,259,691
[45] Mar. 31, 1981

[54] BEAM CURRENT CONTROL SYSTEM FOR IMAGE PICKUP TUBE

[75] Inventors: John F. Monahan; Charles F. Smiley; Arthur C. Wymer, all of Quincy, Ill.

[73] Assignee: Harris Corporation, Melbourne, Fla.

[21] Appl. No.: 969,009

[22] Filed: Dec. 13, 1978

[51] Int. Cl.³ .............................................. H04N 3/16
[52] U.S. Cl. .................................................. 358/219
[58] Field of Search .................. 315/387; 358/219, 42, 358/44, 50, 52

[56] References Cited

U.S. PATENT DOCUMENTS

| | | | |
|---|---|---|---|
| 3,975,657 | 8/1976 | Sato et al. | 358/219 X |
| 3,999,011 | 12/1976 | Sato et al. | 358/219 |
| 4,151,552 | 4/1979 | Sato et al. | 358/219 X |

*Primary Examiner*—Bernard Konick
*Assistant Examiner*—Aristotelis M. Psitos

[57] ABSTRACT

A system for controlling beam current in an image pickup tube so as to prevent comet-tailing and blooming of highlights in the imaged scene. The video signal derived from the image pickup tube (12, 14, 16) is fed back to the beam current control circuitry (22, 24, 26) so that the beam current varies with the video signal. A non-linear amplifier (20) included in the feedback loop has low gain for normal video signals and greater gain for highlights in the video signal. This reduces normal beam current overhead and thus extends the useful life of the tube. The feedback signal provided by the amplifier (20) is a current signal in order to simplify the addition of a DC component to it. A resistor (54) and voltage source (56) perform the addition of the DC component. When multiple image pickup tubes (12, 14, 16) are used, a non-additive mixer (18) combines the plural video signals to provide the amplifier (20) with a signal representative of the video signal of greatest intensity. The amplifier (20) then controls the beam currents in all of the tubes in accordance with the non-additively mixed video signal. In one embodiment (FIG. 6) several comparators (184, 200, 206) monitor the level of the video signal and step-up the beam current when highlights are detected.

7 Claims, 7 Drawing Figures

FIG. 2A
BEAM AND SIGNAL CURRENTS WITH NO LIGHT

FIG. 2B
BEAM AND SIGNAL CURRENTS FOR FULL LEVEL SIGNAL WITH AN AREA HIGHLIGHT

BEAM CURRENT CONTROL SYSTEM FOR IMAGE PICKUP TUBE

BACKGROUND AND FIELD OF THE INVENTION

The present invention relates to systems for controlling the quantity of electron beam current in a camera tube in accordance with a video signal derived from the camera tube.

Television cameras currently in use generally include one or more image pickup tubes to convert an optical image into an electrical video signal. One type of image pickup tube conventionally used includes a photosensitive surface, known as a target, upon which the image is focused. An electron beam scans the target and deposits electrons thereon to charge the surface to a uniform electrostatic potential. Between successive scans by the electron beam, each elemental portion of the target surface will discharge by an amount determined by the intensity of light falling on that portion of the target. Because of this, the light image focused on the target will cause a corresponding positive potential electrostatic image to be formed on the target. As the electron beam scans over the target, current will flow from the electron beam through the target. The magnitude of this current will be determined by the amount of current required to charge that portion of the target being scanned by the electron beam back to the uniform potential. The current flowing from the target electrode, usually referred to as the signal current, thus varies in accordance with the pattern of light imaged on the pickup tube, and represents the video signal which is processed and transmitted to the remote television receiver.

In conventional practice, the magnitude of the current flow in the electron beam scanning the target is fixed at a level which is somewhat greater than the level necessary to recharge the target when it is exposed to a normal intensity light image. When the electron beam current is set at this level, however, the imaging tube is incapable of completely recharging those portions of the target which have been exposed or higher intensity portions of the image. This condition, known as beam shortage or beam starvation, gives rise to such undesirable phenomenon as comet-tailing and blooming in the subsequently reconstructed image. Although this effect could be reduced by increasing the intensity of the electron beam, to do so would result in defocusing of the beam. This would also shorten the useful life of the pickup tube, which is inversely related to the average beam intensity.

More recently, systems have been devised wherein the video signal is fed back to the system which controls the beam current so that the beam current is dynamically varied in accordance with the video signal derived from the target. In this manner, the intensity of the electron beam is automatically set at a higher level when the signal current indicates that a highlight is present at that point on the target. A system of this general type is disclosed in the patent to Sato et al., U.S. Pat. No. 3,999,011.

BRIEF SUMMARY OF THE INVENTION

It is an object of the present invention to provide a system including at least two imaging tubes, where the beam current in at least one of these tubes is increased prior to, and thus in anticipation of, scanning of a highlight which has already been detected in another tube.

It is another object of the present invention to provide a highlight handling system for multitube camera systems wherein the video signals provided by the camera tubes are non-additively mixed so as to provide a single output signal representing whichever of the video signals is greater at that moment, and to use this resulting signal to control the beam current in all three tubes.

It is a further object of the present invention to provide a system utilizing a transconductance amplifier for combining the feedback voltage with a DC beam control signal being supplied to the beam control means associated with each camera tube.

It is still another object of the present invention to provide a system wherein little feedback occurs for low amplitude video signals.

It is still a further object of the present invention to provide a feedback network having a nonlinear gain characteristic.

It is yet another object of the present invention to provide a system employing bilevel feedback signals, rather than continuously variable analog signals.

In one aspect of the present invention, video signals provided by plural camera tubes are nonadditively mixed so as to provide a signal whose amplitude reflects the greater of the plural video signals. A nonlinear transconductance amplifier responds to this non-additively mixed signal to provide a current signal for each of the camera tubes, wherein the amplitude of the current of the current signal is related to the amplitude of the non-additively mixed signal in a nonlinear manner. Each current signal is supplied to a corresponding DC adder circuit which converts the current signal into a voltage signal, and adds a DC voltage representing the desired DC level of the feedback signal. The output of each of these DC adder circuits is applied to the beam current control electrode of one of the camera pickup tubes.

The gain of the transconductance amplifier is set relatively low for low level video signals to avoid the inclusion of excessive beam current overhead during normal video signal conditions. (As used herein, the term "beam current overhead" will be understood to refer to the excess of beam current over signal current.) When the video signal exceeds a predetermined level, however, the gain of the transconductance amplifier is increased so that beam starvation will not occur at the higher signal current levels representative of highlights in the image.

There is also described herein a different system wherein the non-additively mixed signal is applied to several comparator circuits whose outputs are combined to produce the signal which drives the beam current control circuits of the imaging tubes. One of the comparators is triggered whenever the video signal rises above a predetermined limit, and provides an output signal which will cause the beam current to be stepped up whenever this occurs. With this comparator connected in the feedback path, the beam control loop may undesirably oscillate due to the existence within the feedback loop of a threshold, introduced by the comparator. Although oscillations are virtually unnoticeable, and therefore acceptable, for small, spot highlights, it is desirable that this oscillation be avoided for larger, area highlights. A second feedback path is therefore provided for stabilizing the beam current when an area highlight is present. This path includes a second comparator having a low-pass filter connected at its input. The low-pass filter prevents oscillation of the area comparator by effectively opening the feedback loop for the high frequencies at which this oscillation takes place. The outputs of the spot and area comparators are combined so as to provide a beam control signal which will respond very rapidly to highlights, due to the operation of the spot comparator, but which will not oscillate when area highlights are present due to the stable output of the area comparator for these highlights.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION OF PREFERRED EMBODIMENT

Figure 1:
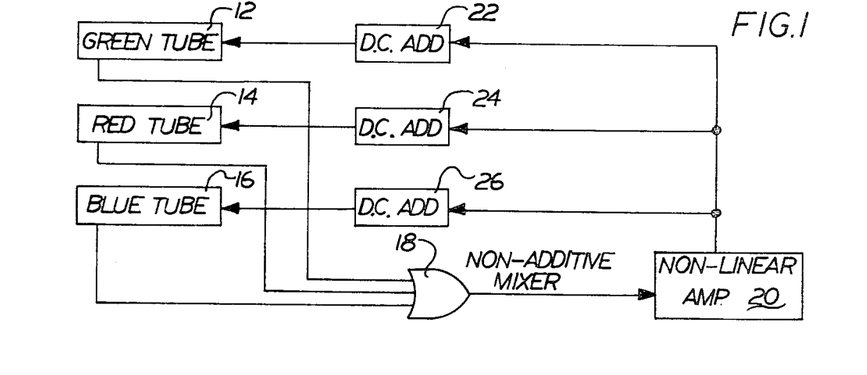
FIG. 1 is a broad block diagram of one embodiment of a highlight handling system in accordance with the teachings of the present invention.

FIG. 1 is a broad block diagram of a color television imaging system embodying several aspects of the present invention. In this system 10, three imaging tubes 12, 14, and 16 are included for providing video signals representative of the green, red, and blue content of the scene being imaged. A lens system, not shown, will separate the light image into green, red, and blue spectral components, and will focus these various spectral components onto the respective tubes 12, 14 and 16. The tubes will therefore image the same scene, but different spectral components thereof. Each of these three tubes 12, 14, and 16 will provide a corresponding vidoe signal representative of the image focused upon the photosensitive surface thereof.

As stated previously, it is desirable to feedback a portion of the video signal to the beam current control electrode of the camera tube in order to minimize blooming and comet-tailing as a result of beam starvation. In one aspect of the present invention, this feedback is accomplished by non-additively mixing the video signals provided by the three imaging tubes, and using the composite signal resulting therefrom to drive the feedback loops. To accomplish this, the FIG. 1 embodiment includes a non-additive mixer 18 which will provide at its ouput an analog signal corresponding to whichever of the three video signals presented at the inputs thereof has the highest intensity. If a highlight appears in any of the three tubes 12, 14, or 16, the high intensity video signal representing this highlight will be passed to the output of the non-additive mixer 18, and will thus appear at the input to a nonlinear amplifier 20, connected thereto. This nonlinear amplifier 20 provides a feedback signal to each of camera tubes 12, 14 and 16 through respective DC adder circuits 22, 24, and 26. These adder circuits add to the feedback signal a DC signal representative of the desired DC value of beam current for the respective tube.

Because of the non-additive mixing of the three video signals provided by non-additive mixer 18, the feedback to several of the tubes will in many cases anticipate the occurrence of a highlight therein. Thus, often a highlight appearing in the scene being imaged will have an unequal spectral content so that the video output of one of the three tubes will begin to rise somewhat prior to the increase in the output of the other two tubes. This rise in video signal will be reflected by an increase in the feedback signal provided to all three tubes, due to the non-additive mixing operation of mixer 18. The beam current in several of the tubes will, thus, increase prior to the increase in demand for beam current occasioned by the occurrence of a highlight on the surface of the respective tube. This assists in preventing beam starvation along the edges of the highlights. Furthermore, the output of the green tube 12 will conventionally be advanced in time with respect to the video outputs of red and blue tubes 14 and 16, due to the operation of other signal processing circuitry not shown herein. Because of this, a highlight occurring in the green video signal will trigger an increase in the feedback to all three of the video tubes, thus anticipating the occurrence of highlight in either red tube 14, or blue tube 16.

As stated previously, the amplifier 20 included in the feedback loop has a nonlinear gain. For video signals having amplitudes within the range of normal variations of the video signal, the nonlinear amplifier 20 has a relatively low gain factor. Because of this, the beam current within the three tubes 12, 14, and 16 will not be increased significantly for normal video signals. This lower gain extends the lifetime of the tube by maintaining the beam current at close to the fixed DC value for normal video signals. Amplifier 20 has a much higher gain, however, for video signals above the normal video range. This increased gain at higher video levels assists in assuring that beam starvation does not occur during scanning of image highlights. To prevent oscillations in the system, however, it is preferred that, even at this greater gain factor, the loop gain still be less than unity.

Figure 2A:
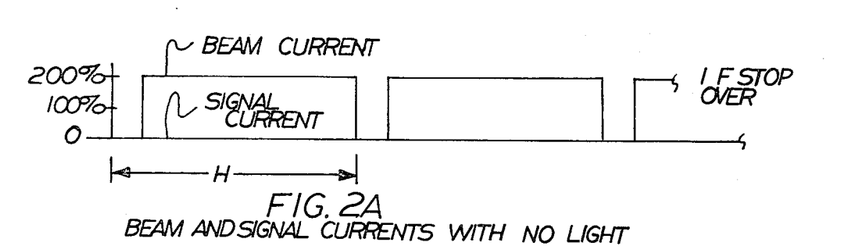
FIGS. 2A and 2B are graphs illustrating the operation of the system of FIG. 1.
Figure 2B:
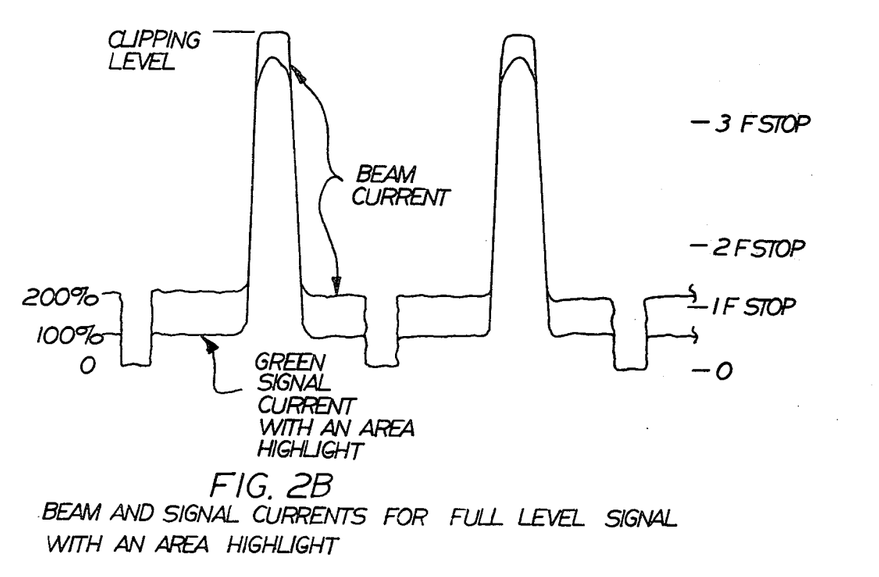

The operation of the circuit of FIG. 1 is illustrated in the graphical illustrations of FIGS. 2A and 2B. FIG. 2A represents a situation in which the lens of the camera is covered so that the targets of the tubes 12, 14, and 16 are not exposed to light. In this situation, the feedback signal will be very small and the beam current will be at a level established by the DC adder circuits 22, 24 and 26. Conventionally, this beam current is set 1F stop over the full level video signal (i.e., at 200% full video), though other settings could, of course, also be used. FIG. 2B illustrates the situation in which the targets of the tubes 12, 14, and 16 are exposed to a full intensity image, with an area highlight therein. As can be seen in this figure, the beam current is increased slightly over the DC value set in the adder circuits 22, 24 and 26 during that portion of time in which the signal current is at the 100% level. This increase in beam current is due to the feedback introduced by mixer 18 and amplifier 20, and is relatively low because of the low gain of amplifier 20 for signals up to this level. During the area highlight, however, the gain of the nonlinear amplifier 20 is increased to be much closer to unity so that the beam current follows the increase in the signal current produced by the area highlight without significant additional reduction in beam overhead. Beam starvation during the scanning of the area highlight is thereby prevented.

Figure 3:
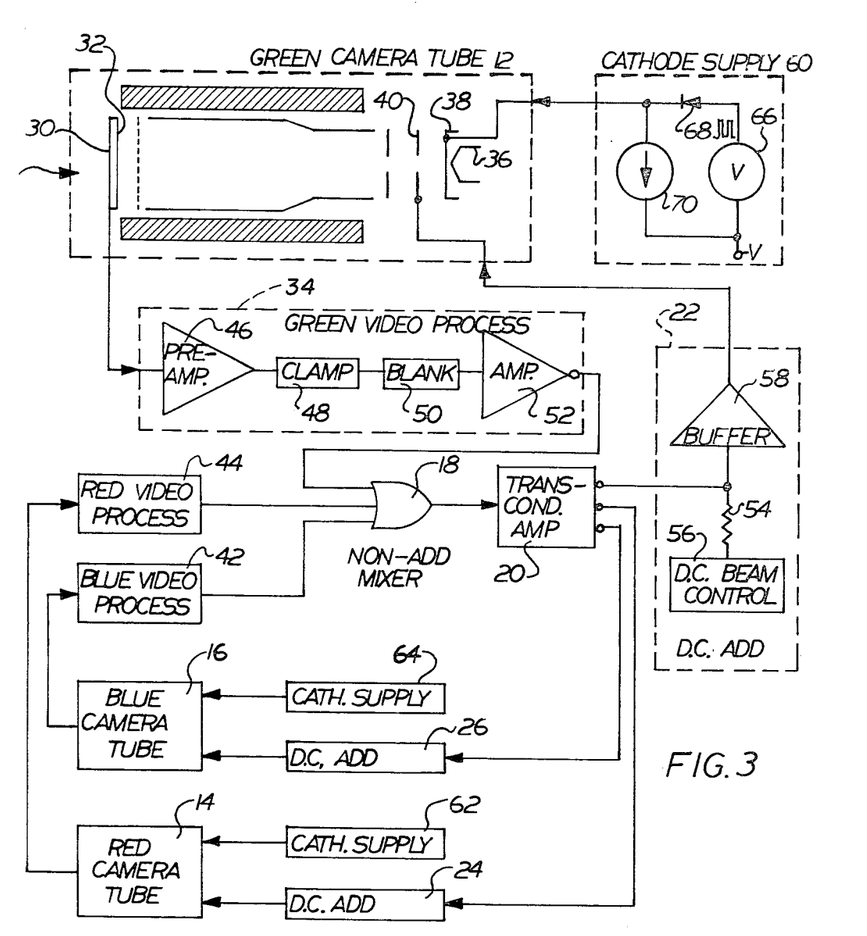
FIG. 3 is a more detailed block diagram of one embodiment of the present invention.

FIG. 3 is a more detailed block diagram of the system of FIG. 1. The camera tube 12 is shown in this figure as being of the conventional photosensitive type, such as a vidicon or plumbicon type, and will preferably be of the recently introduced diode gun plumbicon type. This tube 12 includes a target electrode 30 having a photosensitive layer 32 is formed thereon. The image provided by the lens system will be focused upon the target electrode 30, and will dissipate a surface charge carried on the opposite surface of the photosensitive surface by an amount which varies with the intensity of the light. A positive electrostatic image is thus formed on the surface of the photosensitive layer 32. The photosensitive layer 32 is recharged to a fixed potential by an electron beam which scans the surface thereof. This recharging of the surface due to the scanning of the electron beam produces the video signal current which is processed and transmitted to remote television receivers. The video signal current is also used in the feedback loop for controlling the intensity of the electron beam.

The beam generating portion of the camera tube includes a heater 36 which heats a cathode 38 so that it emits electrons. A beam current control electrode 40 (sometimes referred to as the G1 grid) is provided to which the beam current control signal is applied. The intensity of the beam will be controlled by and will vary with the potential difference between the G1 grid and the cathode. A portion of the electrons passing between the cathode and beam control electrode 40 will pass through an opening in the center of the electrode 40, thus forming the electron beam. This electron beam is then caused to raster scan the photosensitive layer by conventional beam deflection methods.

The video signal currents provided by the three tubes will be converted from a current to a voltage and otherwise processed by corresponding video processors 34, 42, and 44, all of which will have the illustrated form of video processor 34. Video processor 34 includes a preamplifier 46 which converts the signal current into a corresponding voltage and provides some amplification thereof. A clamping circuit 48 clamps the DC value of the video signal to an appropriate voltage level, whereas the blanking circuit 50 blanks the signal during the horizontal and vertical blanking intervals. An inverting amplifier 52 provides at its output an amplified and processed video signal which is supplied to the non-additive mixer 18. Non-additive mixer 18 also receives the processed video signals from video processors 42 and 44, and provides at its output a voltage signal representative at any given time of whichever of the three input signals has a higher intensity. The resulting signal is applied to a nonlinear amplifier 20 which is more specifically illustrated in FIG. 3 as comprising a transconductance amplifier (i.e., an amplifier which converts an input voltage into an output current). As stated previously, the transfer characteristics of transconductance amplifier 20 will be nonlinear. Transconductive amplifier 20 has three outputs, each of which is directed to a corresponding one of the DC adder circuits 22, 24, and 26. An equal level of current $I_F$ is provided on each of these three outputs.

The DC adder circuits 22, 24 and 26, convert the feedback current $I_F$ provided by transconductance amplifier 20 back into a voltage signal, and add to that voltage signal a DC voltage signal which is operator set to establish the DC operating characteristics of that tube. The DC adder circuits 24 and 26 associated with the red camera tube 14 and blue camera tube 16, respectively, will have essentially the same form illustrated in FIG. 3 for DC adder circuit 22. DC adder circuit 22 includes a resistor 54, a voltage source 56, and a buffer circuit 58. Although both the buffer 58 and the resistor 54 are connected to the output line of transconductance amplifier 20, the current flow from the amplifier will essentially pass entirely through resistor 54, since buffer 58 will have a very high input impedance. The DC beam control voltage source 56, on the other hand, will have a very low input impedance. This current flow through resistor 54 will cause a voltage drop across resistor 54, which is directly related to the magnitude of the current flowing therethrough. The voltage at the input of buffer 58, therefore, will be an additive combination of the voltage provided at the output of DC beam control 56, and the voltage drop across resistor 54 due to the current $I_F$ flowing therethrough from transconductance amplifier 20.

The beam control voltage at the output of buffer 58 is provided to the G1 grid 40 of the green camera tube, and controls the magnitude of the beam current. The magnitude of the current at the output of the transconductance amplifier 20 will vary with the current fluctuations in the signal current derived from the target 30. Consequently, as the signal current increases, the feedback current $I_F$ will also increase. This will result in an increase in the voltage across resistor 54, an increase in the voltage applied to buffer 58 and thus to the G1 grid of the camera tube, and an increase in the beam current provided by the camera tube.

In FIG. 3, each of the camera tubes 12, 14, and 16 is shown as having an associated cathode supply 60, 62, and 64. Each of these cathode supplies will preferably have the form illustrated for cathode supply 60. Cathode supply 60 includes a pulsed voltage source 66 which sets the voltage applied to the cathode 38 under normal, noncurrent-limiting situations. During each horizontal scan, the voltage at the output of voltage source 66 will have a DC value which is somewhat more negative than the beam control voltage applied to the G1 grid 40 of the camera tube. As stated previously, the difference between this voltage and the voltage provided by DC beam control circuit 56 will determine the intensity of the electron beam. During the horizontal and vertical retrace intervals, however, the voltage of the output of voltage source 66 will shift to a significantly more positive voltage, thus shutting off the electron beam by causing the cathode to become positive with respect to the G1 grid 40.

The cathode supply 60 also includes a diode 68 and a current source 70, both of which are provided to establish a limit on the electron flow from the cathode 38 to the G1 grid 40. Current source 70 will be set to have a current value corresponding to the maximum acceptable current flow from the cathode 38. Current from the cathode will flow through the current source. The remainder of the current required by the current source will be derived from the voltage source 66. Because of this, the diode 68 will normally be forward biased and the voltage at the cathode 38 will be one diode drop below the voltage at the output of voltage source 66. If the current flow from the cathode reaches and tries to exceed the current flow through current source 70, however, diode 68 will become reverse biased, isolating the voltage source 56 therefrom. Since the DC resistance of current source 70 is extremely high, the current through cathode 38 will be unable to exceed the limit established by the current source 70. The current flow from the cathode 38 is therefore limited to the current flow set in current source 70.

Figure 4:
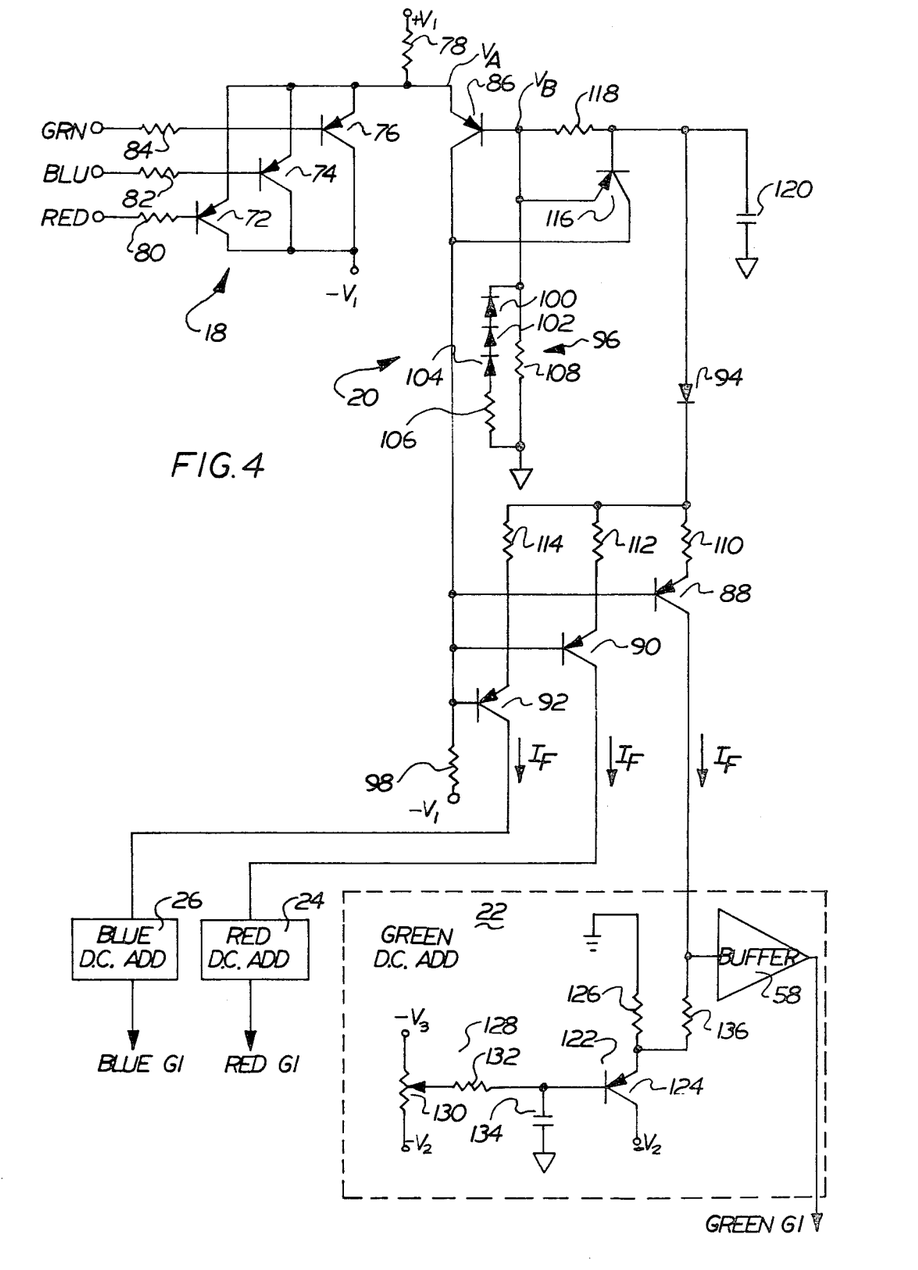
FIG. 4 is a more detailed circuit schematic of a portion of the system of FIG. 3.

FIG. 4 is a more detailed circuit schematic of the non-additive mixer 18 and transconductance amplifier 20 of FIG. 3. The non-additive mixer 18 includes three transistors 72, 74 and 76 having their collectors commonly connected to a negative voltage source $-V_1$, and their emitters connected to a positive voltage source $+V_1$ through a common emitter resistor 78. Non-additive mixer 18 thus comprises three emitter-follower amplifiers having a common emitter connection. The red, blue, and green video signals are applied to the bases of transistors 72, 74, and 76 through respective base resistors 80, 82, and 84. These video signals have been inverted by the respective video processors so that a higher intensity video signal is represented by a more negative voltage at the input to the non-additive mixer 18. The voltage at the common emitter of transistors 72, 74, and 76 will ride at approximately one diode drop above the most negative voltage appearing at the bases of the three transistors. The voltage appearing across resistor 78 therefore will follow the more negative of the three video signals, and will at any given time represent the one of the three signals having the greatest intensity at that time.

The nonlinear transconductance amplifier is shown in FIG. 4 as including a transistor 86 having its emitter connected to the emitters of transistors 72, 74, and 76, so as to comprise essentially a differential amplifier arrangement. Any voltage change across resistor 78 will be reflected in a change in the voltage at the base of transistor 86 of the nonlinear amplifier. The nonlinear amplifier 20 includes further transistors 88, 90, and 92 connected in the feedback arrangement across the base-collector junction of transistor 86. This feedback arrangement is such as to cause the transistors 88, 90, and 92 to draw enough current from the base circuit of transistor 86 through a diode 94 to cause the voltage at the base of transistor 86 to be approximately one diode drop below the voltage at the emitter thereof. The majority of the current passing through diode 94 will be derived from a nonlinear circuit 96 connected between the base of transistor 86 and ground. This is because the impedance looking into the base of transistor 86 will be quite high, due to its emitter-follower connection with resistor 78. The resistance of the nonlinear circuit 96 is much lower than this high resistance value, however.

The feedback arrangement between transistors 88, 90, and 92 and transistor 86 may be more readily understood by considering the following. As stated previously, the voltage at the emitter of transistor 86 will have a value $V_A$ which represents the more negative of the three input video signals. The voltage $V_B$ at the base of transistor 86 will be one diode drop below $V_A$. If the current flow through the diode 94 is too low to create this voltage across the nonlinear circuit 96, the voltage at the base of transistor 86 will be less than one diode drop below $V_A$. Because of this, transistor 86 will become partially cutoff, and the collector voltage thereof to become more negative due to a connection to the negative voltage source $-V_1$ through a collector resistor 98. As the voltage at the collector of transistor 86 becomes more negative, however, transistors 88, 90 and 92 will be turned on by a greater amount, causing an increase in the current flowing through diode 94.

If the current flow through diode 94 rises above the value which will produce the required voltage at the base of transistor 86, on the other hand, the base current through transistor 86 will increase, causing the collector current and thus collector voltage to also increase. This will, in turn, cause current flow through transistors 88, 90, and 92 to diminish, thus reducing the current through diode 94 back to the value at which the voltage at the base of transistor 86 is at the value $V_B$, which is one diode drop below $V_A$.

The transistors 88, 90, and 92 are thus automatically controlled so that the voltage $V_B$ is one diode drop below $V_A$. As $V_A$ varies, $V_B$ must similarly vary to maintain this relationship. Since $V_B$ is established by the current flow through diode 94, it follows that the current flow through diode 94 will vary with variations in $V_A$. The magnitude of this current will be established by the resistance in the non-linear circuit 96, since this determines the current level necessary to produce the voltage signal $V_B$.

This nonlinear circuit 96 will have one resistance value for normal amplitude video signals, and will have a much lower resistance value for video signals above normal video intensities so as to provide the nonlinear characteristic referred to earlier. Thus, when the voltage $V_A$ is at normal video intensities, the voltage $V_B$ will only be slightly negative (for example, will be between 0 and $-1.5$ volts). Because of this, a series connection of three diodes 100, 102, and 104 will be reverse biased, essentially disconnecting a resistor 106 from the nonlinear circuit. The entire resistance value of the nonlinear circuit 96 is then set by the resistor 108 which is connected in parallel with the diodes and resistor 106. When the voltage $V_A$ drops to a negative voltage which is more negative than normal intensity video signals (for example, $-2$ to $-5$ volts), the voltage $V_B$ will be sufficiently below ground to turn on diodes 100, 102, and 104, so that resistor 106 will be connected into the nonlinear circuit across the resistor 108. The current flow through diode 94 will then be established by the parallel connection of resistors 106 and 108. This lower resistance value may, for example, be approximately three times less than the resistance value of resistor 108. Thus, the gain of the nonlinear circuit will increase by a factor of three when the video signals rise above normal video intensity.

The three transistors 88, 90 and 92 include corresponding emitter resistors 110, 112, and 114 which control the apportioning of current flow between the transistors. These resistors may be scaled to provide any desired apportioning of current flow and may, for example, have equal resistance values so as to provide equal currents $I_F$ through each of the transistors 80, 90, and 92. In that event, equal currents $I_F$ will be provided to each of the DC adder circuits 22, 24, and 26, respectively connected to the collectors of transistors 88, 90, and 92.

In the illustrated embodiment, current limiting is provided by a transistor 116 having a current sensing resistor 118 connected across its base-emitter junction. This current sensing resistor is connected in the current path between nonlinear circuit 96 and diode 94. During normal, noncurrent-limiting operation, the voltage drop across resistor 118 will be insufficient to turn on transistor 116, so that it will be cutoff and will have essentially no effect on the remainder of the circuit. When the current through resistor 118 rises to the point at which the base-emitter junction of transmitter 116 begins to turn on, however, current will be shunted from the collector to the base of transistor 96 via transistor 116. This limits further increases in current, and opens the feedback loop in the event that currents in excess of the limit are called for by the video signals.

The circuit also includes a frequency compensating capacitor 120, connected between diode 94 and ground. This lowers the impedance at the base of transistor 86 for high frequencies, providing some peaking in the frequency response of the circuit at these higher frequencies. This is included to compensate for a high frequency roll-off introduced by stray capacitance in the circuit, mainly associated with the lines connecting the DC adder circuits 22, 24 and 26 to the respective camera tubes. The size of this capacitor 120 must be limited, however, since it has been found that excessive bandwidth can cause oscillation of the circuit.

FIG. 4 also includes a more specific circuit diagram of one of the DC adder circuits 22. As illustrated, the DC adder circuit 22 includes an emitter-follower 122 comprised of a transistor 124 and an emitter resistor 126, and an input circuit 128. The voltage at the emitter of transistor 124 will be one diode drop above the voltage applied to the base of transistor 124 from the input circuit 128. Input circuit 128 includes a potentiometer 130 which may be manually adjusted by the operator so as to set the DC current level of the electron beam. The voltage signal at the wiper arm of potentiometer 130 is applied to the base of transistor 124 through a low-pass filter comprised of a resistor 132 and a capacitor 134. This low-pass filter eliminates noise in the DC signal provided at the emitter of transistor 124.

The DC adder circuit 22 also includes a resistor 136 for converting the feedback current $I_F$ provided by transistor 88 into a voltage. The voltage drop across resistor 136 will be equal to the feedback current $I_F$ times the resistance value of resistor 136. The voltage at the collector of transistor 88, and thus the voltage applied to the G1 grid of the tube via a buffer 58, is then equal to the DC voltage at the emitter of transistor 124, plus the feedback voltage established by the voltage drop across resistor 136 due to the feedback current $I_F$.

Figure 5:
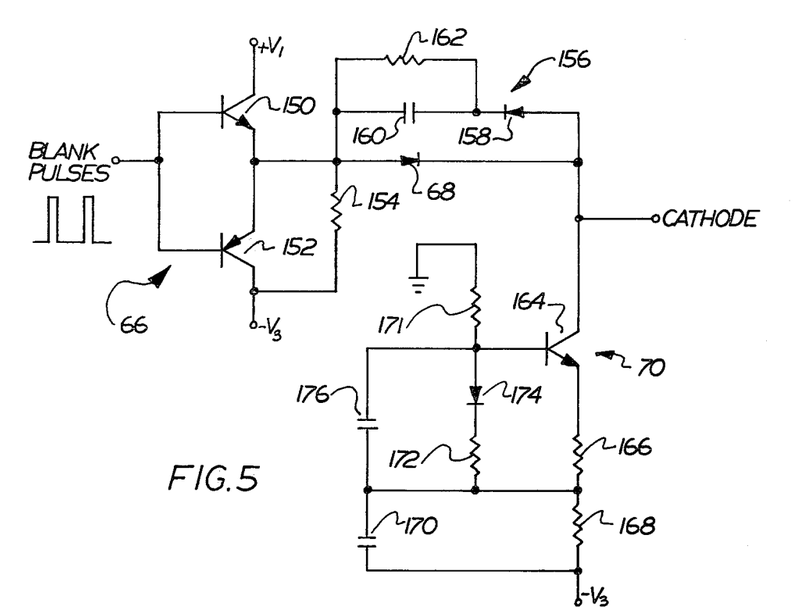
FIG. 5 is a more detailed circuit schematic of another portion of the system of FIG. 3.

FIG. 5 is a more detailed circuit schematic of the cathode supply 60 shown generally in FIG. 3. This cathode supply includes a voltage source comprised of two complementary transistors 150 and 152 connected with their collector-emitter current paths in series, and having their bases commonly connected to a source of horizontal and vertical blanking pulses (not shown). This voltage source may be considered to be an emitter-follower amplifier, wherein a resistor 154 (connected between the emitters of transistors 150 and 152 and a negative voltage source) represents the emitter resistor of the amplifier.

Under normal operation, transistor 150 will be on and transistor 152 will be off. During a scan of the target by the electron beam, the voltage applied to the bases of transistors 150 and 152 will be a selected negative voltage and the voltage at the emitter of transistor 150 will be one diode drop below this voltage. This reverse-biases the base-emitter junction of transistor 152, thus turning it off. During the blanking intervals, the voltage applied to the bases of transistors 150 and 152 will shift to a much higher voltage level. The voltage at the emitter of transistor 150 will follow this voltage, maintaining transistor 152 in cutoff.

Transistor 152 is provided so as to positively pull down the voltage developed across resistor 154 on the trailing edge of the blanking pulses. On the trailing edge of the blanking pulses, when the voltage applied to the bases of transistors 150 and 152 abruptly shifts to a more negative voltage, the voltage at the emitter of transistor 150 may not follow this voltage immediately, due to capacitance associated with the circuitry connected thereto. Because of this, transistor 150 will go into cutoff and transistor 152 will instead turn on, forcing the voltage at the emitter to follow the trailing edge of the blanking pulse. After the trailing edge of the blanking pulse, the voltage at the emitter of transistor 150 will again fall to one diode drop below the base voltage, causing the transistor 152 to again turn off and transistor 150 to turn on.

As stated previously, a diode 68 connects the emitter of transistor 150 to the cathode of the camera tube. The voltage at the cathode will therefore normally be fixed at one diode drop below the emitter voltage of transistor 150. A circuit 156 is connected across diode 68, and provides a current path for discharging the capacitance associated with the cathode of the tube. This circuit 156 includes a series connected combination of a DC blocking capacitor 160 and a diode 158. Blocking capacitor 160 insures that no DC current will flow through the circuit 156, whereas diode 158 is included to disconnect the capacitor 160 from the cathode when the diode 68 is forward biased. A resistor 162 having a reasonably high resistance value is connected across the capacitor 160 so that any charge which may be developed thereacross will be dissipated during the interval between successive blanking pulses.

As stated previously, the cathode supply circuit 60 also includes a current source, generally indicated at 70. This current source essentially comprises an emitter-follower amplifier, having a fixed DC voltage supplied to the bases thereof. This emitter-follower includes a transistor 164 having an emitter resistor 166 connecting the emitter thereof to a negative DC voltage. A resistor 168 and capacitor 170 are included for filtering the DC voltage applied to the current source 70. The current through the collector of transistor 164 is fixed by applying a fixed DC voltage to the base of transistor 164. The DC biasing circuitry consists of a resistive voltage divider represented by a resistor 170 in series with a resistor 172. A diode 174 is connected in series with resistor 172 so as to provide temperature compensation of the circuit by providing a temperature dependent voltage shift which will follow the temperature dependent voltage shift of the base-emitter junction of transistor 164. A capacitor 176 filters the DC voltage applied at the base of the transistor. Since the voltage across the emitter resistor 166 is fixed, the current through the collector of transistor 164 will similarly be fixed.

Figure 6:
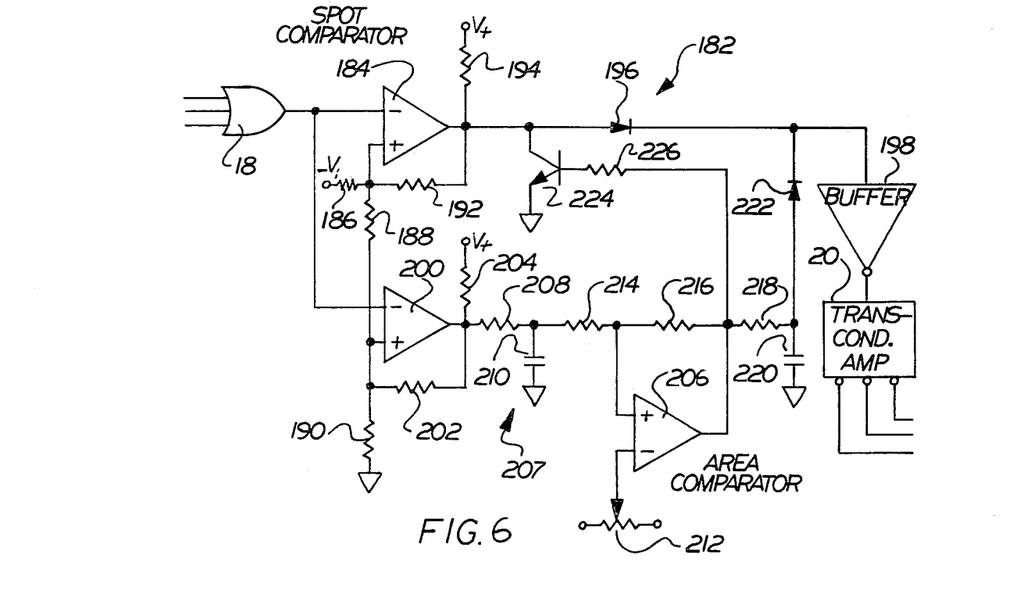
FIG. 6 is a circuit schematic of a portion of another embodiment of a highlight handling system in accordance with the teachings of the present invention.

FIG. 6 illustrates a portion of another highlight handling system embodying other features of the present invention. In general, this highlight handling system may be quite similar to that illustrated in FIG. 3, except that additional processing circuitry, generally indicated at 182, will be connected between the non-additive mixer 18 and the transconductance amplifier 20. This circuitry 182 includes a comparator 184 which operates to step up beam current when the mixed video signal exceeds a predetermined threshold. Since this feedback loop may oscillate, a second path (comprised of comparators 200 and 206 and their associated circuitry) is included which provides a more stable output for area highlights.

Comparator 184 is triggered whenever a highlight is present in the video signal. The negative input to comparator 184 is connected to the output of non-additive mixer 18, whereas the positive input is supplied with a reference voltage signal via a resistive voltage divider network including resistors 186, 188, and 190. A positive feedback resistor 192 is included to provide the comparator 184 with a small degree of hysterisis in the switching characteristics thereof, and thereby improve the noise performance of the comparator. In FIG. 6, comparator 184 is of the open collector type, and thus the output represents the open collector of the output transistor of the comparator. A resistor 194 connects the output of comparator 184 to a positive voltage supply so that a voltage signal is developed at the output of comparator 184. The output of comparator 184 is connected to the transconductance amplifier through a diode 196 and an inverting buffer amplifier 198.

When the video signals are within the normal video range, the output of non-additive mixer 18 will be less negative than the reference voltage applied to the positive input of the comparator 184. The output of comparator 184 will therefore be at a ground voltage level. In this case, essentially no increase in beam current will occur. When a highlight appears in the video signal, however, the output of non-additive mixer 18 will become more negative than the reference voltage applied to the positive input of comparator 184, so that the output will shift to a high level. This will cause the feedback current provided by transconductance amplifier 20 to increase, producing a resulting increase in the beam current in all of the camera tubes.

It has been found that the inclusion of a threshold of this type in the feedback loop will often cause the beam control system to oscillate. Although this is not important for small highlights in the imaged scene, such as reflections from eyeglasses, etc. it becomes noticeable for larger, area highlights. The FIG. 6 circuitry therefore includes a second signal path for providing a stable feedback signal for these area highlights. This path includes a second comparator 200, connected to the output of non-additive mixer 18. Comparator 200 also has a reference voltage provided to the positive input thereof from the junction between resistors 188 and 190. As with comparator 184, comparator 200 includes a positive feedback resistor 202, and has a collector resistor 204 connected at the output. The output of comparator 200, as with comparator 184, will shift to a high voltage level whenever a highlight is present in the video signal.

This signal is provided to an area comparator 206 via a low-pass filter 207 comprised of a resistor 208, and a capacitor 210. The inclusion of low-pass filter 207 in the input of area comparator 206 will essentially eliminate oscillations in the feedback path by filtering the output of comparator 200. Because of the time delay introduced by the low-pass filter 207, the area comparator 206 will only trigger for highlights greater than a certain size. Smaller highlights will not persist long enough to overcome the delay and trigger the comparator.

The negative input to comparator 206 receives a reference signal via a potentiometer 212, whereas the positive input is provided with the output of the low-pass filter 207 through a resistor 214. Again, a feedback resistor 216 will be included to provide some degree of hysterisis in the transfer characteristics of comparator 206.

Unlike comparators 184 and 200, comparator 206 has a conventional output rather than an open collector output, and does not require a collector resistor such as resistors 194 and 204. The output of comparator 206 is provided to the transconductance amplifier 20 through a second low-pass filter comprised of a resistor 218 and a capacitor 220, and a diode 222.

When an area highlight is present in the video signals provided to non-additive mixer 18, comparator 206 will eventually shift to a high level, causing a corresponding signal level to be applied to the buffer 198 through the diode 222. This will override any signal provided by the spot comparator 184. In order to eliminate any oscillations in the beam current control loop as soon as possible following the triggering of area comparator 206, a transistor 224 is provided, shunting the output of comparator 184 to ground. The output of area comparator 206 is applied to the base of transistor 224 through a resistor 226, and controls the switching of transistor 224. When the area comparator 206 is triggered, the output of comparator 184 is shorted to ground through transistor 224, thus opening the feedback loop including comparator 184 and quenching any oscillations which may be present in that loop.

In the FIG. 6 embodiment, then, the transconductance amplifier 20 will provide a stepped up beam current whenever either a spot highlight is present, as indicated by the output of spot comparator 184, or an area highlight is present, as indicated by the output of comparator 206. Furthermore, as soon as the output of area comparator 206 shifts to a high level, the output of comparator 184 will be shunted to ground, eliminating any oscillations in the feedback loop even before the voltage across capacitor 220 rises to the maximum level.

In the embodiment illustrated in FIG. 6, a separate comparator 200 is provided at the input to area comparator 206. This enables the use of a different reference voltage level for each of comparators 184 and 200. By appropriate setting of the reference voltages, comparator 200 can be made to trigger at a somewhat lower voltage than comparator 184. This will reduce the delay between triggering of the spot and area comparators to some extent. If desired, however, the output of comparator 184 may be directly applied to resistor 208, thus eliminating the need for comparator 200 and its associated circuitry. In this event, the transistors 224 and 226 will also be eliminated, and diode 196 will be replaced by an analog electronic switch whose switching is controlled by the output of area comparator 206. In this fashion, the feedback loop including the spot comparator is again broken when the output of area comparator 206 shifts to a high level, indicating that an area highlight is present.

Although the invention has been described with respect to a preferred embodiment, it will be appreciated that numerous variations and alterations of parts may be made without departing from the spirit and scope of the present invention, as defined in the appended claims.

What is claimed is:

1. Apparatus for use in a system including at least two image pickup tubes, each having a target upon which a light image may be directed and electron beam generating means for scanning said target with an electron beam so as to cause a video signal current to flow from said target, said beam generating means being responsive to a beam current control signal to control the current level of said electron beam, said apparatus comprising:

means responsive to said video signal currents provided by each of said pickup tubes to provide a first signal having a value which varies at any given time with variations in whichever of said signal currents is greater at that time, and means for providing an independently variable D.C. current control signal for each of said image pickup tubes and for adding a signal to each of said D.C. beam current control signals which varies in accordance with variations in said first signal, thereby providing sum signals each representing the beam current control signal for a respective said image pickup tube, whereby the beam currents in all of said image pickup tubes have independently setable D.C. levels and are dynamically varied in accordance with whichever of said signal currents is greater.

2. Apparatus as set forth in claim 1, wherein said means for providing said beam current control signals for each of said image pickup tubes comprises nonlinear amplifier means responsive to said first signal for nonlinearly amplifying said first signal to derive a second signal therefrom, said amplifier means having a smaller but non-zero gain for first signals less than a predetermined magnitude than for those greater than said predetermined magnitude, and beam control means for providing said D.C. beam current control signals for each of said pickup tubes and for adding a signal to each of said D.C. beam current control signals which varies in accordance with said second signal.

3. Apparatus for use in a system including at least two image pickup tubes, each having a target upon which a light image may be directed and electron beam generating means for scanning said target with an electron beam so as to cause a video signal current to flow from said target, said beam generating means being responsive to a beam current control signal to control the current level of said electron beam, said apparatus comprising:

means responsive to said signal currents provided by each of said pickup tubes to provide a first signal having a value which varies at any given time with variations in whichever of said signal currents is greater at that time, and means for providing said beam current control signals for each of said image pickup tubes and for varying each of said beam current control signals in accordance with variations in said first signal, comprising nonlinear amplifier means responsive to said first signal for nonlinearly amplifying said first signal to derive a second signal therefrom, said amplifier means having a smaller gain for first signals less than a predetermined magnitude than for those greater than said predetermined magnitude, and beam control means for providing said beam current control signals for each of said pickup tubes and for varying each of said beam current control signals in accordance with said second signal, said beam current control means including means for setting the D.C. values of each of said beam current control signals independently of the others, whereby the beam currents in all of said image pickup tubes are dynamically varied in accordance with whichever of said signal currents is greater.

4. Apparatus for use in a system including at least one image pickup tube having a target upon which a light image may be directed and electron beam generating means for scanning said target with an electron beam so as to cause a video signal to be generated at said target, comprising:

nonlinear amplifier means responsive to said video signal for non-linearly amplifying said video signal to derive a feedback signal therefrom, said amplifier means having a smaller but non-zero gain for video signals less than a predetermined magnitude than for those greater than said predetermined magnitude, and beam current control means for utilizing said feedback signal to vary the current level of said electron beam from a reference level.

5. Apparatus as set forth in claim 4, wherein said image pickup tube includes a beam current control electrode for controlling the level of current of said electron beam, and wherein said beam current control means comprises adder means for adding said feedback signal to a D.C. signal representing the desired D.C. current level of said electron beam, and applying means for applying the resulting sum signal to said beam current control electrode of said image pickup tube.

6. Apparatus for use in a system including at least one image pickup tube having a target upon which a light image may be directed and electron beam generating means for scanning said target with an electron beam so as to cause a video signal to be generated at said target, comprising:

nonlinear amplifier means responsive to said video signal for non-linearly amplifying said video signal to derive a feedback signal therefrom, said amplifier means having a smaller gain for video signals less than a predetermined magnitude that for those greater than said predetermined magnitude, and beam current control means for utilizing said feedback signal to vary the current level of said electron beam from a reference level, wherein said image pickup tube includes a beam current control electrode for controlling the level of current of said electron beam, and wherein said beam current control means comprises adder means for adding said feedback signal to a D.C. signal representing the desired D.C. current level of said electron beam, and applying means for applying the resulting sum signal to said beam current control electrode of said image pickup tube, and wherein said feedback signal comprises a current signal, and wherein said adder means comprises voltage source means for providing said D.C. voltage signal representing the desired D.C. operating level of said electron beam, and impedance means serially interconnected between said nonlinear amplifier means and said voltage source means so that said feedback current flows through said impedance means, said impedance means developing a voltage thereacross in response to said feedback current whereby a sum voltage signal is provided at the junction between said impedance means and said nonlinear amplifier means corresponding to the sum of said D.C. voltage signal and said voltage signal across said impedance means, said sum voltage signal being provided to said beam current control means by said applying means.

7. Apparatus for use in a system including at least one image pickup tube having a target upon which a light image may be directed and electron beam generating means for scanning said target with an electron beam so as to cause a video signal to be generated at said target, comprising:
- first comparator means responsive to said video signal to provide a first output indicating whether said video signal is greater or less than a first predetermined limit;
- filter means for filtering said video signal to provide a filtered signal;
- second comparator means responsive to said filtered signal to provide a second output indicating whether said filtered signal is greater or less than a second predetermined limit; and,
- means for increasing the current level of said electron beam whenever either said first output indicates that said video signal is greater than said first predetermined limit or said second output indicates that said filtered signal is greater than said second predetermined limit.

* * * * *